United States Patent [19]

Prior et al.

[11] 4,315,967
[45] Feb. 16, 1982

[54] MAGNESIUM OXYCEMENT/FIBROUS WEB COMPOSITES

[75] Inventors: William Prior, Newark, Ohio; Richard S. Lindstrom, Reading, Mass.

[73] Assignee: Arthur D. Little, Inc., Cambridge, Mass.

[21] Appl. No.: 117,540

[22] Filed: Feb. 1, 1980

[51] Int. Cl.³ .............................................. B32B 15/14
[52] U.S. Cl. .................................... 428/285; 428/286; 428/303; 428/319.1; 156/39; 106/106; 428/312.4; 428/537; 428/703
[58] Field of Search ............... 428/286, 285, 284, 303, 428/304, 312, 314, 315, 318; 106/106

[56] References Cited

U.S. PATENT DOCUMENTS

| | | | |
|---|---|---|---|
| 3,778,304 | 12/1973 | Thompson | 106/106 X |
| 3,837,995 | 9/1974 | Floden | 428/285 X |
| 3,908,062 | 9/1975 | Roberts | 428/284 X |
| 3,975,565 | 8/1976 | Kendall | 428/284 |
| 4,084,982 | 4/1978 | Prior et al. | 106/106 X |
| 4,141,744 | 2/1979 | Prior et al. | 106/106 X |

Primary Examiner—P. Ives

[57] ABSTRACT

Essentially nonflammable, moldable, strong laminates formed of alternating layers of cured magnesium oxycement and a fibrous web, e.g., paper formed of cellulosic, glass or synthetic resin fibers or mixtures thereof. The magnesium oxycement may contain a suitable filter, the surfaces of the laminate may be modified and composites may be formed with a wide variety of core materials. The laminates are made by coating the fibrous webs with a reactive slurry of a magnesium salt solution and magnesium oxide. The fibrous web materials used are impermeable to the extent that no appreciable amount of the magnesium salt solution is absorbed and no appreciable amount of the magnesium oxide is filtered out onto the surface or into the intertices of the web.

25 Claims, 13 Drawing Figures

MAGNESIUM OXYCEMENT/FIBROUS WEB COMPOSITES

This invention relates to laminated construction materials and more particular to nonflammable laminated materials formed to include paper or other fibrous webs and a process for making them.

There are available a number of different types of materials from which to make such prefabricated construction components as wall panels and panel connectors, doors, ceiling sections, insulation and the like and to form a wide range of consumer items such as furniture and furniture frames, trays, etc. Among the materials most often used for these items are particle boards, chip boards, plywoods, papers, composition hardboards, phenolic laminates, and a wide variety of filled synthetic resins including polystyrenes, epoxies, urea and phenol formaldehydes, polyurethanes and the like.

Although all of these prior art composite materials have proven to be useful in the construction of a number of different items, they possess the property of flammability, at least to an undesirable degree for many uses. This is particularly true of wood- and paper-based composites, e.g., particle and chip boards, plywood and paper/phenolic laminates. Therefore, it would be highly desirable to have a composite material which could be used in place of the presently used materials in many applications and which exhibited little or no flammability. To be able to provide such a nonflammable composite material consisting of or incorporating a paper or other fibrous web laminate formed from relatively inexpensive web materials and a nonflammable cement would be even more attractive.

It is therefore a primary object of this invention to provide a composite laminated material which is essentially nonflammable and which lends itself to the fabrication of a wide range of components for construction as well as consumer items such as furniture, etc. It is another object to provide a composite material of the character described which comprises a nonflammable cement/fibrous web laminate, which may be shaped or contoured, and which may be formed to have a range of desired physical properties among which are dimensional stability, bonding strength and rupture and impact strengths. Yet another object is to provide a composite material which can be sawed, nailed and otherwise handled in a manner similar to plywoods, particle and chip boards, composition hardboards and the like to enable it to be substituted for these materials in many applications. It is still another object of this invention to provide such a nonflammable composite material which can be formed on existing equipment using as the fibrous web component relatively inexpensive grades of paper or other fibrous webs. A further object is the providing of a composite material comprising a magnesium oxycement/paper laminate in which the magnesium oxycement may contain a wide range of fillers. It is yet another object to provide a composite material in which a nonflammable inorganic cement/fibrous web laminate is combined with a core material, which may be flammable, in a manner to thermally protect the core material.

It is another primary object of this invention to provide a method of making an improved composite material comprising a magnesium oxycement/fibrous web laminate and, if desired, of contouring and shaping the resulting composite material. A further object is to provide a method of the character described which permits the use of otherwise flammable fibrous web materials and core materials in the manufacture of composite materials which are in themselves essentially nonflammable.

Other objects of the invention will in part be obvious and will in part be apparent hereinafter.

The invention accordingly comprises the several steps and the relation of one or more of such steps with respect to each of the others, and the article possessing the features, properties, and the relation of elements, which are exemplified in the following detailed dislosure, and the scope of the invention will be indicated in the claims.

For a fuller understanding of the nature and objects of the invention, reference should be had to the following detailed description taken in connection with the accompanying drawings in which.

According to one aspect of this invention there is provided a composite material comprising a laminate formed of bonded, distinct, alternating layers of a cured magnesium oxycement and a fibrous web, the layers of the magnesium oxycement imparting strength and nonflammability to the laminate. Within any composite material the thicknesses of the layers making up the laminate may be uniform throughout or they may be graded; the magnesium oxycement layers may, if desired, incorporate fillers; and the composite material may have any desired surface finish and it may also incorporate a core material. The composite material is particularly suitable for molding or shaping into various configurations prior to or during the curing of the magnesium oxycement layers.

According to another aspect of this invention there is provided a method for forming a nonflammable composite, comprising the steps of laying up alternating layers of a reactive water slurry of a magnesium salt solution and magnesium oxide capable of forming a magnesium oxycement and a fibrous web material; and curing the reactive slurry to form the magnesium oxycement under conditions of temperature and pressure to bond the layers into a laminate and to prevent removal of any appreciable amount of water therefrom; the water content of the slurry and the water penetrability of the fibrous webs being selected such that each of the magnesium oxycement layers remains substantially separate and distinct from the fibrous web layers and retains within it substantially all of the water present in the slurry, thereby to impart strength and nonflammability to the laminate. The method may also include such optional steps as applying a finishing layer to one or both surfaces of the composite, incorporating or affixing a core material to the laminate; varying the thicknesses of the layers; and adding fillers to the magnesium oxycement. The laminate formed may be shaped into a desired configuration prior to or during curing.

The basic structure of the composite material of this invention is comprised of a laminate of alternating layers of a fibrous web, preferably a paper, and a mangesium oxycement which may be either magnesium oxychloride or magnesium oxysulfate. As will be apparent in the following detailed description the term "fibrous web" is used in a relatively broad sense to refer to fibrous-based sheets meeting specific requirements; and the magnesium oxycements are prepared to have specific characteristics. The use of these two components in combination in a laminate gives rise to a unique product which may be used as is, with surface finishes, or in conjunction with a wide range of core materials.

The magnesium oxycements, sometimes more generally referred to as inorganic resin or plastic cements, are known in the art. An improved process for the preparation of these inorganic cements (magnesium oxychloride and magnesium oxysulfate) is described in U.S. Pat. No. 3,320,077. These magnesium oxycements have found use in the manufacture of molded or cast structures such as construction panels, bricks, flooring and the like and as protective coatings.

More recently, it has been found how to form filled magnesium oxycements having good physical properties as disclosed in U.S. Pat. No. 4,084,982.

In accordance with the teaching of U.S. Pat. No. 3,320,077, the magnesium oxycements used in this invention are made by forming a highly concentrated aqueous solution of magnesium chloride or magnesium sulfate containing a watersoluble phosphate. Into the resulting so-called "gaging solution" is added reactive magnesium oxide with high-speed, high-shear blending to provide a reactive slurry. Although the process of U.S. Pat. No. 3,320,077 has been found to be particularly suitable for forming the reactive slurry used, it is within the scope of this invention to use any suitable technique in forming the reactive slurry which provides for the dispersion and breaking up of the MgO agglomerates in the gaging solution. Since the process of this invention involves the coating of the web material with the oxycement during laminate formation, it may be necessary or preferable to add a viscosity and/or flow control agent to the slurry. As disclosed in U.S. Pat. No. 4,084,982, fillers may be added at one or more points in the process, e.g., to the gaging solution, to the reactive slurry, or during layup. One important feature of this process is that the total amount of water in the reactive slurry (water of hydration of the magnesium salt plus water added in making the solution) is consumed in the reaction and contained within the final magnesium oxycement. Thus essentially all of this water remains bound in the finally cured oxycement and is available as a self-extinguishant. As will be more fully realized hereinafter, this feature makes it possible to form an essentially nonflammable magnesium oxycement/fibrous web laminate, giving rise to the unique articles of manufacture of this invention.

The steps of forming the liquid uncured magnesium oxycement used in making the laminates of this invention may be briefly described. Reference should also be had to U.S. Pat. Nos. 3,320,077 and 4,084,982, as well as to FIG. 9 which diagrams the process of this invention.

The magnesium salt used may be either magnesium chloride, preferably used as the hexahydrate $MgCl_2.6HO$, or magnesium sulfate, preferably used as the heptahydrate $MgSO_4.7H_2O$. The first step of the process is the formation of a solution of the magnesium salt in water. This solution, known as the gaging solution, may be supersaturated with respect to the magnesium salt and is preferably formed to contain a small amount of water-soluble phosphate which may be added prior to the addition of the magnesium salt to the water, as is preferable in the case of the use of sodium hexametaphosphate, or subsequent to the addition of the salt, as may be done in the use of phosphoric acid. Among the water-soluble phosphates which may be used are phosphoric acids, polyphosphates and particularly so-called sodium hexametaphosphate, various alkali metal mono- and dibasic phosphates, ammonium phosphates and the like. The amount of the water-soluble phosphate used may range up to about 6% by weight of the magnesium oxide added while a preferable range is between about 1% and 4%.

In preparing the gaging solution, the weight concentration of the magnesium salt in the water solution formed should preferably range between about 60% and 75% based on the weight of the hydrated salts. However, concentrations somewhat lower than 60% may be used so long as they do not produce blowing in the laminate during the curing step. The amount of water in the reactive slurry at the time of layup should not be appreciably greater than that which can be retained by the magnesium oxycement for reaction to form the final cured inorganic layer. This results in maintaining the magnesium oxycement layers as distinct and separate from the fibrous web layers and in preventing the escape of water as steam which can rupture the laminate structure during curing, while yet retaining the maximum water as a fire extinguishant.

The magnesium oxide used may be either natural or synthetic; and the amount of magnesium oxide depends upon the magnesium salt used to form the magnesium oxycement. If magnesium chloride is used, then the molar ratio of $MgCl_2.6H_2O$ to $MgO$ is between about 1 to 3 and about 1 to 8; while if $MgSO_4.7H_2O$ is used the molar ratio is between about 1 to 3 and about 1 to 14.

The magnesium oxide is added to the magnesium salt solution containing the phosphate. It is preferable that the magnesium oxide be added slowly and that the slurry during formation be processed in a high-shear blender, e.g., a Daymax or Meyers blender, an homogenizer, or any other equipment capable of deflocculating and thoroughly dispersing the magnesium oxide particles.

Generally, the viscosity of this reactive water slurry when it is formed ranges from about 1,000 to about 25,000 centipoises (measured at 25° C.); and the slurry is preferably thixotropic. The optimum viscosity of the slurry at the time it is applied to the fibrous web layers may readily be determined with relation to the character of the surface of the fibrous webs used; and with relation to the requirements set by the slurry coating equipment used in laying up the laminate assembly. The addition of fillers to the magnesium oxycement normally increases the reactive slurry viscosity. In addition, if necessary, a small amount of a viscosity and flow control agent may be added to the slurry to adjust its viscosity. Any suitable, well-known inert viscosity and flow control agent such as clay, fuller's earth, attapulgite and the like may be used. These additives are preferably blended into the reactive slurry after the magnesium oxide is thoroughly mixed in and the amount of them added will depend upon the coating viscosity required for the slurry. The final coating viscosity preferably ranges from about 500 to about 50,000 centipoises at the time the magnesium oxycement is applied to the paper. However, the coating technique and web surface characteristics may dictate a viscosity outside this range.

Various types of fillers may be added to the liquid uncured magnesium oxycement, the term "filler" being used to include, but not to be limited to, microfiber fillers which serve in a role which is not solely that of a reinforcing material. As pointed out in U.S. Pat. No.4,084,982, these microfibers contribute to the flexural as well as tensile and impact strengths of cured magnesium oxycements formed into various structural configurations. These microfibers are defined as being no longer than about one-fourth inch and having aspect ratios from about 5 to about 1500. Exemplary of such microfibers are so-called "milled" glass fibers which also contain small particulate pieces of glass, and fibers formed of mineral slag and of such naturally occurring materials as wollastonite, asbestos tailings and the like.

In addition to the microfibers, other fillers such as particulate material, long glass fibers, and continuous glass mats or fiber glass fabrics may be used. Such fillers must be of a character and size which permit permeation through and around them to allow the magnesium oxycement in the laminate to form an essentially continuous integral layer. Generally, the thickness of magnesium oxycement layers containing such fillers may be greater than those resin layers which do not contain fillers. In forming the laminate, the same fillers or different fillers may be used in all or in selected ones of the magnesium oxycement layers. The choice and locations of the fillers within the basic laminate may be used to vary the physical properties of the final article incorporating the laminate. A number of embodiments of filled magnesium oxycement layers are described below.

The reaction between the finely divided magnesium oxide, the magnesium salt and the water (preferably derived from both the water of hydration of the salt and that added in forming the gaging solution) is completed during curing. This means that since essentially all of the water present in the reactive slurry takes part in this reaction and since the finely divided magnesium oxide must be retained within the slurry, the fibrous web used in the forming of the laminate must be of a character to permit the layers of uncured reactive slurry to maintain essentially the same composition during laminate formation which includes assembling the layers, optional prepressing, pressing and curing. This in turn means that the fibrous web can not absorb any appreciable amount of the magnesium salt solution and/or permit the filtering out of any appreciable amount of the finely divided magnesium oxide particles onto its surface and within its interstices; for to do so would be to interfere with the balance of the reaction components during curing and magnesium oxycement formation. In the case of some fibrous webs, it may be necessary, in order to achieve an optimum laminate, to bring the webs to a predetermined moisture content to prevent absorption of the magnesium salt solution.

Although paper is generally preferred from a cost point of view for the fibrous web component, a wide range of materials formed of natural or synthetic fibers may also be used. The papers may be formed exclusively of cellulosic fibers or they may be mixtures of fibers such as cellulosic, glass, synthetic and the like. Normally papers are, of course, nonwoven, but it is possible to use woven fibrous webs provided they meet the requirements set forth. Nonwovens incorporating unidirectional fibrous web reinforcement, e.g., continuous glass fiber mats, are also illustrative of suitable fibrous webs. It is, in any case, preferable that the fibrous webs possess high internal bond strengths.

A preferred fibrous web material is kraft paper ranging in weight from about 10 pounds to about 100 pounds per 3000 square feet (about 16 to 165 grams/square meter). If the paper is too heavy, the final laminate tends to exhibit the physical characteristics of the paper, e.g., water sensitivity with some resulting delamination and decreased strength, rather than of the desired physical properties of the laminate. The fibrous webs in a laminate may be uniform in weight throughout or they may be graded in weight to impart desired properties to the laminate. Illustrative embodiments of these variations are described below.

In some cases it may be necessary to apply a size to the surfaces of the fibrous web to impart the desired characteristics to the web material. Suitable sizes for this purpose are known and are commercially available. Illustrative of such sizes are rosins, acrylic acid polymers, styrene/maleic anhydride copolymers, various water-soluble polymers precipitable from solution by alum in the presence of divalent or trivalent ions, and the like.

Sufficient liquid uncured magnesium oxycement is applied to the fibrous web surface in forming the laminate to provide finally cured magnesium oxycement layers ranging between about 2 and about 20 mils thick (about 0.05 mm to about 0.5 mm) in those cases in which the magnesium oxycement contains very little or no reinforcing fillers. When fillers are added, the magnesium oxycement layers may be considerably thicker, the actual thickness being chosen to attain the desired physical properties from the filled inorganic resin material within the laminate.

Although the final magnesium oxycement layers and fibrous web layers may be of essentially the same thickness, this is not necessary. Since the thicknesses may be different for the two types of layers and since the thicknesses may be graded within any one laminate, the relative amounts of magnesium oxycement and fibrous web in a laminate may be best expressed in terms of a magnesium oxycement/fibrous web weight ratio. This ratio may vary between about 90/10 and about 10/90.

The total plies (fibrous webs plus cement layers) may range from two up to any predetermined optimum number depending upon such factors as the desired physical properties and the intended use of the finished composite article, type of fibrous web used, and final form of the composite, e.g., with or without a core, kind of surface finishing used, etc.

Figure 1:
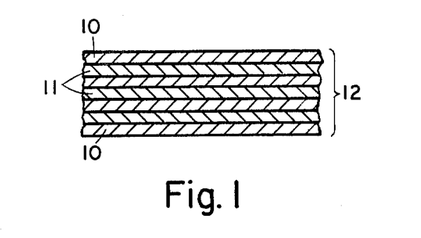
FIG. 1 is a cross section of one embodiment of a magnesium oxycement/fibrous web laminate made in accordance with this invention and having fibrous webs of equal thickness throughout.

As shown in the much enlarged cross sectional drawing of FIG. 1, the fibrous web layers 10 and magnesium oxycement layers 11 are essentially distinct and separate, and they are easily identified by visual examination. However, the binding between them within the laminate 12 is so strong that any induced rupture of the laminate normally occurs within the fibrous web and not at the web-magnesium oxycement boundaries.

The structure of the laminates of this invention is distinguishable from the more usual form of paper or cloth laminates made with synthetic organic resins, for in these prior art laminates the synthetic organic resins, e.g., phenol formaldehydes, polyesters, epoxy resins and the like, are caused to penetrate the fibrous webs in a manner to render it essentially impossible to identify the separate plies of the final laminate. The structure of the laminates of this invention is also distinguishable from those structures formed of magnesium oxycements having glass fabric or glass fiber fillers, for in those structures the magnesium oxycements are formed and cured to penetrate the interstices of the fabric or to completely encase the fibers without forming a distinct magnesium oxycement layer. However, as shown below, one or more magnesium oxycement layers of the laminate of this invention may comprise such a combination of filler and resin.

It is believed that the unique structure of the laminate of this invention, i.e., the remaining of the magnesium oxycement plies as distinctly separate and integral layers, imparts the nonflammable characteristics to the laminate. Since the magnesium oxycement is nonflammable and exhibits essentially zero flame spread, zero smoke density and zero fuel contribution, it provides an effective firebreak against the spread of flames and heat into the next or adjacent fibrous web ply, making it possible to make a nonflammable laminate, even of paper or other normally flammable materials. It may be further postulated that these firebreaks are created because the separate magnesium oxycement layers contain within them essentially all of the water present in the uncured liquid resin used in their formation. Thus each magnesium oxycement layer is apparently self-extinguishing.

Figure 2:
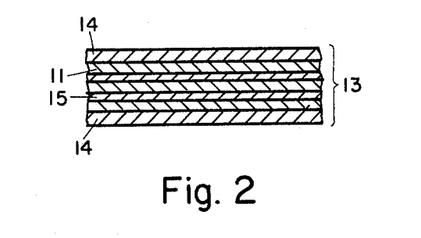
FIG. 2 is a cross section of a modification of the laminate of FIG. 1 in which the thickness of the fibrous webs varies.

The various plies making up the laminate 13 need not be of equal thickness as illustrated in FIG. 2 wherein the surface layers of fibrous webs 14 are thicker than the internal layers 15. Likewise the thickness of the magnesium oxycement layers or plies may be graded through the laminate. In the laminate 16 of FIG. 3, the outermost layers 17 of magnesium oxycement are relatively thick and have embedded within them a reinforcing filler shown as a coarsely woven mat 18. This reinforcing filler should be of a character which permits the magnesium oxycement to readily penetrate therethrough so that layer 17 is essentially an integral continuous layer of the inorganic resin. Such an arrangement, particularly if mat 18 is formed of a nonflammable material such as glass fibers, offers added strength and flame resistance to the laminate. It is also, of course, within the scope of this invention to use a single thick layer of either the fibrous web (ply 14 of FIG. 2) or of the magnesium oxycement (ply 17 of FIG. 3) in forming the laminate.

Figure 3:
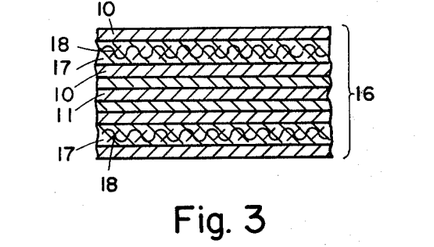
FIG. 3 is a cross section of another embodiment of a magnesium oxycement/fibrous web laminate incorporating a reinforcing filler in one or more of the magnesium oxycement layers.
Figures 4, 6:
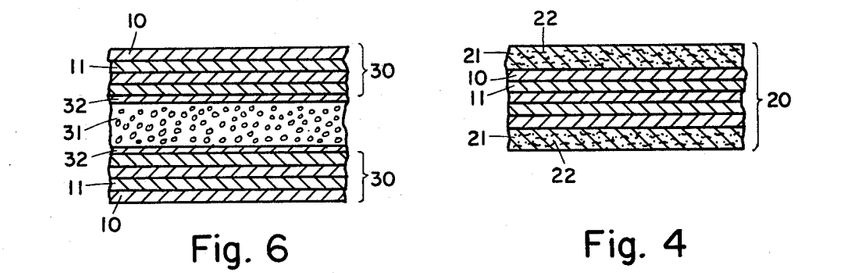
FIG. 4 is a cross section of yet another embodiment of the laminate of this invention illustrating the incorporation of one or more layers of filled magnesium oxycement into the composite.
FIG. 6 is a cross section of a composite comprising the laminate of this invention combined with a core.

In the laminate 20 of FIG. 4, the outer layers 21 are shown to be magnesium oxycement with microfiber fillers 22, as defined in U.S. Pat. No. 4,084,982, distributed throughout. As in the case of layers 17 of FIG. 3, the use of the microfiber reinforcing filler 22 permits the layers 21 to be formed as thicker layers and affords added strength and greater flame resistance. Also, as in the laminate 16 of FIG. 3, laminate 20 may be formed with a single filled resin surface layer 21 if, for example, it is to be used in applications wherein protection from heat and/or flames need be provided on only a single side of the composite structure incorporating the laminate.

Figure 5:
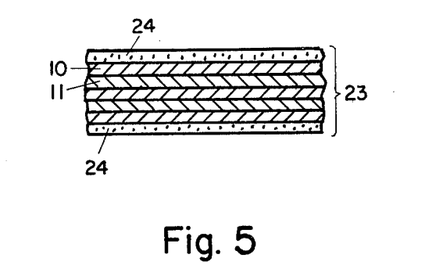
FIG. 5 is a cross section of another embodiment of a magnesium oxycement/fibrous laminate having a finishing surface adhered thereto.

FIG. 5 illustrates a laminate 23 having an outer layer 24 applied to one or both surfaces. Such outer layer may be a protective or decorative coating. For example, it may be a gel coat, a resin-impregnated paper adhered thereto, an embossed or otherwise decorative sheet material, a fabric, a synthetic resin, etc. Depending upon the nature of this outlayer, it may be applied during the last step in the laminate forming process, or as a separate step; and a suitable adhesive may be used, if necessary, to affix it to the laminate.

As shown in FIG. 6, laminates 30 constructed in accordance with this invention may be adhered to one or both sides of a core material 31. Exemplary of suitable core materials are the foamed or cellular synthetic resins such as polyurethane, polystyrene or polyesters and the like. It is also possible, of course, to use a cellular inorganic resin cement as described in U.S. Pat. No. 4,141,744 as the core material. An adhesive 32 may be required to bond the laminate 30 to core 31 and it may be chosen from a wide range of suitable adhesives known and commercially available, e.g., latices of natural or synthetic rubbers or solutions of rubbery polymers. The core material need not, of course, be nonflammable inasmuch as the laminate 30 provides the required protection against burning.

As is evident from FIGS. 1–6, the laminates of this invention and the composites incorporating them may be formed in many different embodiments, for it is within the scope of this invention, for example, to form laminates wherein the surface layers may be either a fibrous web ply or a magnesium oxycement ply (with or without an additional coating); the ply thicknesses may vary throughout the laminate and need not be symmetrically arranged from one surface to the other; and any core material may be used with any desired arrangement in relationship to the laminate or laminates adhered thereto.

Figure 7:
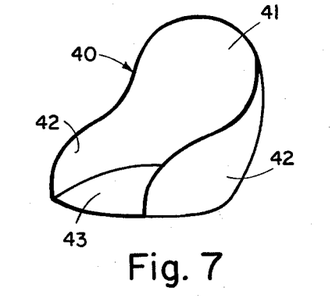
FIG. 7 is a perspective view of a chair component made in accordance with this invention and illustrative of a contoured structural article formed of a magnesium oxycement/fibrous laminate.
Figure 8:
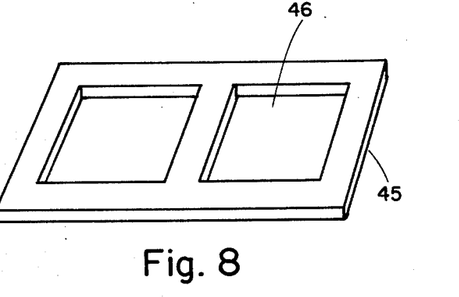
FIG. 8 is a perspective view of a wall panel made in accordance with this invention and illustrative of another contoured structural article formed of a magnesium oxycement/fibrous laminate.

The magnesium oxycement/fibrous web laminate of this invention may be shaped or molded either prior to or during the curing step, to form a wide range of contoured structures, such as the chair component 40 of FIG. 7 comprising a back 41, arms 42 and seat 43 molded as an integral unit; or the wall panel 45 shown in FIG. 8 to have recessed areas 46. It will be appreciated that the structures of FIGS. 7 and 8 are only illustrative of the many different forms and uses for the nonflammable composite material of this invention.

Figure 9:
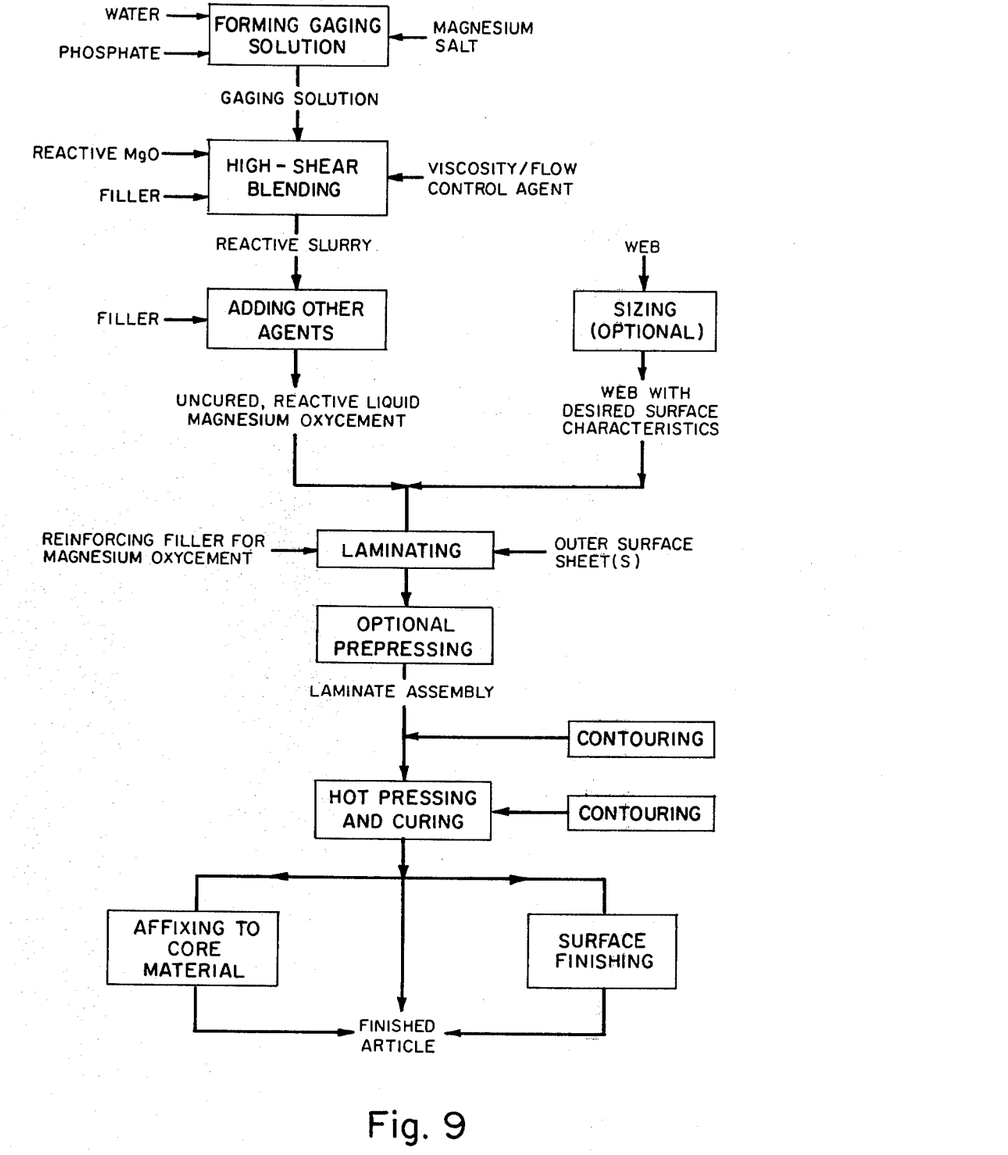
FIG. 9 is a flow diagram of the method of this invention.

FIG. 9 illustrates, in the form of a flow diagram, the method of this invention to form the laminates and composites incorporating them. Inasmuch as the formation of the reactive slurry is described in detail in U.S. Pat. No. 3,320,077, it is only necessary to note that if a viscosity/flow control agent is to be used it will be preferable to add it subsequent to the high-shear blending of the MgO into the gaging solution. Those fillers which are to be uniformly distributed throughout the magnesium oxycement layer, e.g., the microfibers defined in U.S. Pat. No. 4,084,982 are preferably added to the reactive slurry just prior to its use in forming the laminate plies.

If it is necessary to size the fibrous web material to impart to it the desired degree of water impenetrability this is done in accordance with well-known techniques.

The actual laying up or laminating of the plies to form a laminate assembly is accomplished by applying the uncured, reactive liquid magnesium oxycement at essentially room temperature to the fibrous web material. It will be appreciated that many different techniques, including hand lay up, and many different types of apparatus may be used in this step. If a reinforcing web, e.g., web 18 of the laminate shown in FIG. 3, is included, it may be treated as an additional ply in forming the laminate assembly; and in those embodiments in which the separate outer layer, e.g., layer 24 of FIG. 5, is preformed, it may also be treated as an additional ply.

Subsequent to the formation of the laminate assembly it may be prepressed at essentially room temperature, using pressures ranging between about 10 and about 100 pounds pr lineal inch (about 1.75 and 17.5 kg/linear cm.). Prepressing may be used to ensure the uniform distribution of the magnesium oxycement, the complete contacting and bonding of the ply surfaces and the removal of any air which could expand and cause ruptures in the laminate during heat curing. In many cases prepressing is not necessary; but if it is performed the optimum pressure chosen for this step will depend, at least in part on the formulation of the reactive magnesium oxycement used, number and thickness of plies, and the like. Care must be taken not to use pressures great enough to force any appreciable amount of the magnesium oxycement out of the assembly.

Although magnesium oxycements, and hence the laminates of this invention, may be cured under ambient conditions, the laminate assembly is preferably subjected to a final hot pressing and curing. In this step, the temperature of the platens of the hot press, of the air in an air press tunnel, or of the dies in a mold used to effect hot pressing preferably range between about 210° and 300° F. (about 95° and 150° C.); and pressures preferably range from about 10 to about 100 psi (about 700 to about 7100 gm/cm$^2$). The time period over which the laminate is exposed to hot pressing will depend upon the temperature and pressure used and number and character of the layers making up the laminate. As an illustration, a 25-layer laminate can be adequately cured in a hot press with platens maintained t about 230° F. (110° C.) using about 20 psi (about 1400 gm/cm$^2$) in two minutes.

In the composite article embodying the laminate of this invention is to have some predetermined configuration, then it is shaped either prior to or during hot pressing. In the first instance after the step of shaping, the contoured but essentially uncured laminate is heated to cure the magnesium oxycement. The wall panel of FIG. 8 may be made in this way. If shaping is accomplished during hot pressing and curing this is conveniently done in a heated die mold. Typically such items as the chair component shown in FIG. 7 will be made this way.

The laminate may be adhered to a core material using a suitable adhesive and/or it may be given a surface finish using such techniques as painting, spraying, roll coating and the like.

FIG. 10–13 illustrate in diagrammatic form some exemplary apparatus which may be used to form the laminate. For convenience in describing the various apparatus embodiments illustrated it will be assumed that the fibrous web used is a kraft paper.

Figure 10:
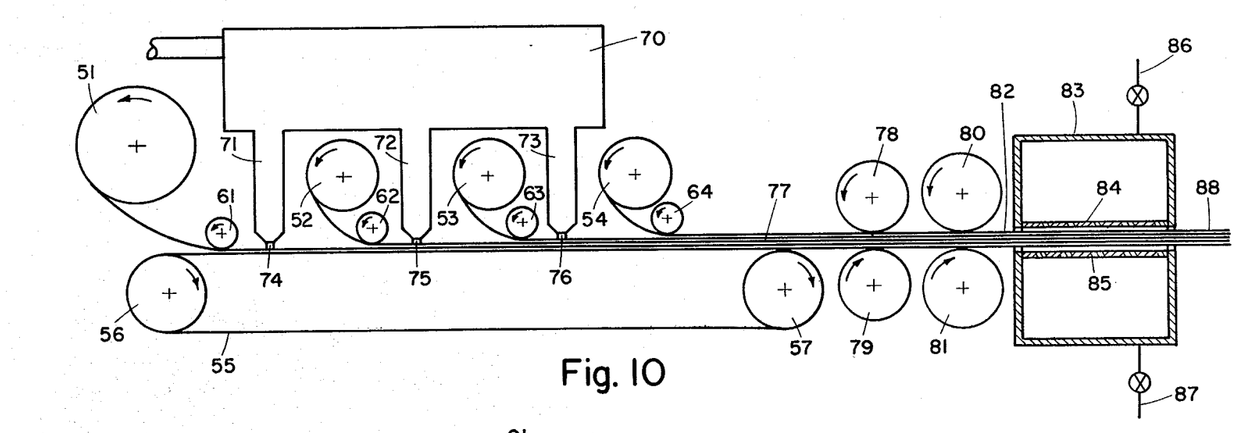
FIG. 10 is a diagrammatic representation of one embodiment of apparatus suitable for forming the laminate of this invention which employs multiple coating stations and incorporates an air press tunnel for final pressing and curing.

In FIG. 10 the ply assembly is formed by alternately laying down continuous fibrous webs and coatings of the reactive magnesium oxycements, continuously moving the assembly along through prepressing rolls and effecting the hot curing step in an air press tunnel.

Assuming that a laminate such as shown in FIG. 1 or 2 is to be formed, kraft paper will be supplied from rolls 51, 52, 53 and 54, that from supply roll 51 being laid down first on a suitable forward moving conveyance means such as endless belt 55 driven around rolls 56 and 57 in the well-known manner. Kraft paper guide rolls 61, 62, 63 and 64 are provided to ensure accurate placement of each kraft web. The reactive, liquid uncured magnesium oxycement is supplied from a reservoir 70 to a series of coating stations 71, 72 and 73, each terminating in a suitable coating nozzle for delivering the liquid magnesium oxycement 74, 75 and 76 at a predetermined rate to attain the desired resin layer thickness. The resulting ply assembly 77 is then passed through prepressing rolls 78 and 79 and 80 and 81 and the prepressed assembly 82 is conducted through an air press tunnel 83. As noted previously, prepressing rolls 78–81 may be omitted. The air press tunnel is equipped with perforated, heated upper and lower platens 84 and 85 so spaced that they clear the surfaces of the laminate by a few mils. Pressurized air is introduced through valve-controlled lines 86 and 87 into the tunnel and it is heated by the platens as it passes through them. Thus the hot air provides the necessary heat and pressure to effect the curing of the magnesium oxycement in the laminate 88 which is continuously withdrawn from air press tunnel 83.

It is, of course, within the scope of this invention to use as many fibrous web supply rolls and reactive slurry coating stations as are necessary to form laminates with the desired number of layers. Moreover, the apparatus illustrated in FIG. 10 is adaptable to the making of the laminates shown in FIGS. 3, 4 and 5. For Example, to make the laminate of FIG. 3, the second fibrous web supply roll 52 may be replaced with a means to supply a continuous reinforcing mat, thus embedding the mat in the magnesium oxycement. This arrangement may then be repeated further along in the layup apparatus. Likewise, a magnesium oxycement reactive slurry containing reinforcing fillers uniformly mixed in may be applied to endless belt 55 (having a suitable release agent if necessary) by suitable coating means (not shown) forward of the first kraft paper supply roll 51. In a similar manner, a surface layer material may be supplied from a supply roll ahead of first kraft paper supply roll 51. It is apparent that many modifications in the apparatus of FIG. 10 are possible in order to make a wide range of laminates.

Figure 11:
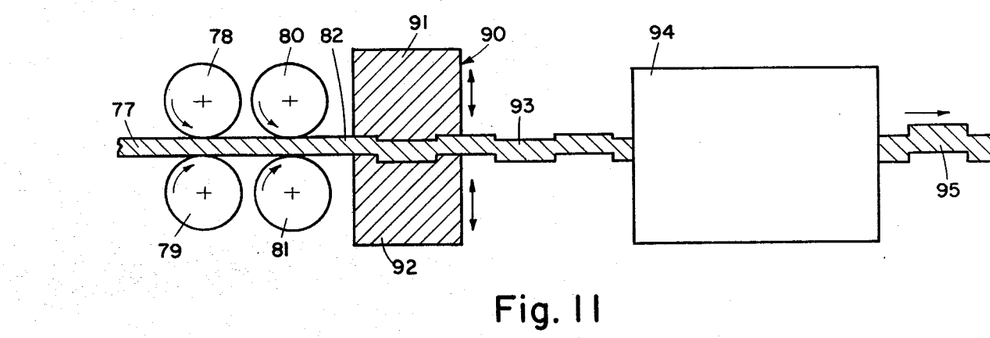
FIG. 11 illustrates a modification of the apparatus in which a die-press is used to impart a desired configuration to the laminate and, if desired, to simultaneously effect curing.

FIG. 11 illustrates apparatus suitable for shaping the laminate either prior to or during heat curing. Lengths of the ply assembly 77, made for example by the apparatus of FIG. 10, are formed into a laminate assembly and the assemblies are then intermittently fed to a molding means 90 formed of dies 91 and 92 which may be at ambient temperature or heated up to about 212° F. (100° C.) if final curing of the molded laminate 93 is to be carried out later in separate means, such as hot air oven 94. The cured configured laminate 95, withdrawn from oven 94, constitutes the finished article. Alternatively, the dies 91 and 92 may be heated to the required curing temperature and the hot air oven omitted.

Figure 12:
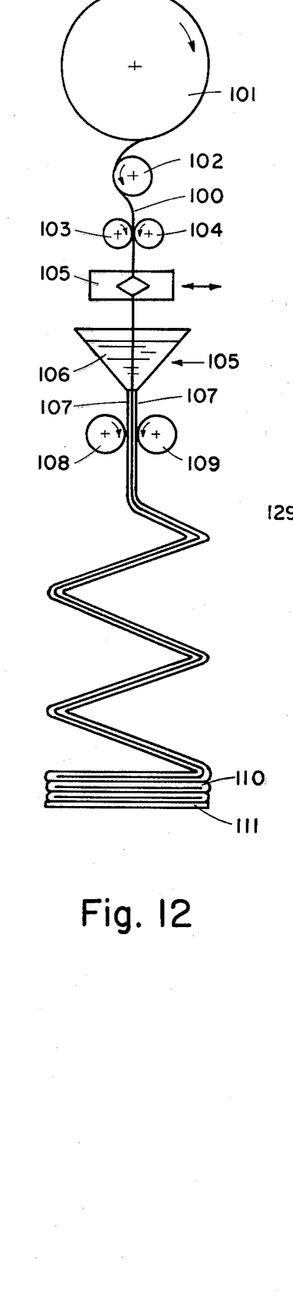
FIG. 12 illustrates diagrammatically another embodiment of apparatus particularly suitable for forming the laminate of FIG. 1 which uses a single coating station.

FIG. 12 illustrates apparatus suitable for forming laminates such as shown in FIG. 1 and employing a single fibrous web supply means and a single magnesium oxycement coating station. The kraft paper 100 is provided from a supply roll 101 around a tension and guide roll 102 through the nip defined between guide rolls 103 and 104 to a precreasing means 105 which is actuated (by means not shown) to place a crease in the kraft paper at predetermined distances and alternating directions. The precreased kraft paper is then passed through a coating station 105 to contact the liquid magnesium oxycement 106 to have a coating 107 of the liquid deposited on both surfaces. The coating thickness is regulated by two opposed rolls 108 and 109 and the coated kraft paper is then folded along the creased lines to build up the necessary number of plies to form the laminate 110 which may be placed on and adhered to a backing sheet 111. Apparatus of this type is well known in the art. Laminates built up in this manner are particularly suitable for forming shaped structures.

Figure 13:
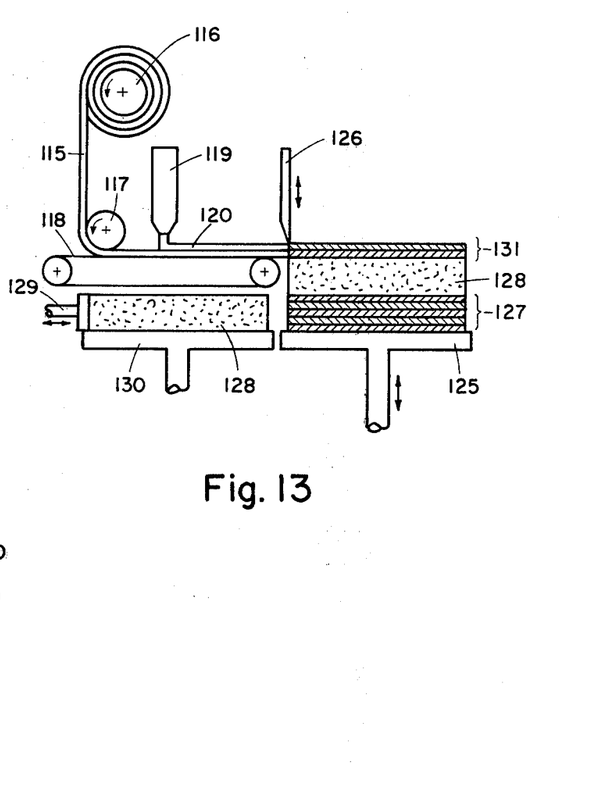
FIG. 13 illustrates diagrammatically yet another embodiment of apparatus particularly suitable for forming laminates incorporating a central core.

FIG. 13 illustrates diagrammatically yet another type of apparatus for forming the composites of this invention and offers the possibility of directly incorporating a core material which is structurally capable of withstanding the pressures required in the steps of pressing and curing. Since the curing temperature range is relatively low, it will normally not be a deterrent to the incorporation of the core during laminate formation. Again using kraft paper as an example of the fibrous web, in the apparatus of FIG. 13 the paper 115 is supplied from roll 116 around a guide roll 117 onto an endless belt mechanism 118 which takes it through a coating station 119 to have a coating of the liquid magnesium oxycement 120 deposited thereon prior to its being laid on a laminate support base 125 which can be moved vertically by means not shown. The forward motion of the endless belt 118 and the discharge of liquid resin 120 are timed and controlled to permit the coated kraft paper to be cut by knife means 126. Laminate support 125 is then moved downwardly to be in a position to accept another layer of coated kraft paper.

When the desired number of plies to form laminate 127 has been built up and a final sheet of paper has been laid down, the support 125 is dropped down to permit a core 128, treated if necessary with an adhesive, to be moved into place by a suitable advancing means 129 from a core support 130 and then the assembly is moved back into place to permit the laying down of the plies for laminate 131 (shown to be only partially formed). It is, of course, possible to use the apparatus of FIG. 13 for forming composites without a core material.

The method and composite articles of this invention will be further illustrated by the following examples which are meant to be illustrative and not limiting.

The reactant slurry used in all of the examples was formed by preparing a gaging solution containing 70% by weight of magnesium chloride hexahydrate. The gaging solution was made by adding 7 parts by weight (2% by final slurry weight) of phosphoric acid to 105.5 parts by weight of water and then adding 237.5 parts by weight of magnesium chloride hexahydrate to form a highly concentrated (70%) solution of the magnesium chloride. To this gaging solution was then added 282 parts by weight of magnesium oxide with high shear mixing to form the reactant slurry in which the molecular ratio of $MgO:MgCl_2.6H_2O:H_2O$ was 6:1:11. In those cases wherein a viscosity/flow control agent and/or microfiber reinforcing fillers were added, they were blended into the reactive slurry with low-shear blending after the magnesium oxide had been completely mixed in.

The laminates were laid up by hand using a standard paint roller to coat on the liquid reactive magnesium oxycement. Test panels 6 inches×6 inches (15.25 cm×15.25 cm) and 12 inches×12 inches (30.5 cm×30.5 cm) were made up using three or more layers of the fibrous web. Prepressing at room temperature was done on some of the samples in a laboratory press using a pressure of about 250 psi; but since prepressing of the laminate assembly made no appreciable difference in the physical properties of the laminate, it was generally omitted. The hot pressing/curing step was carried out in a laboratory press at about 35 psi at about 120° C. for usually 6 minutes. Temperatures as low as about 70° C. for longer periods could also be used.

Modulus of rupture and modulus of elasticity values were obtained on specimens which were 1"×6" using ASTM Test D-790. The impact strengths reported were determined using ASTM Test D-256 on unnotched specimens. Some of the samples were boiled at atmospheric pressure in water for two hours and then reevaluated to determine the change in modulus of rupture.

A number of laminates were formed using kraft paper, liner paper, sized kraft or liner paper and so-called "glass paper" of various weights and in various number of layers.

TABLE 1

Physical Properties of Magnesium Oxycement/Kraft Paper Laminates

| Ex. No. | Wt. of Web lbs/3000ft² | No. of Web Layers | Wt. Ratio MOC to Web | Spec. Grav. Laminate | Modulus of Rupture | | | Impact Strength ins/lb. |
|---|---|---|---|---|---|---|---|---|
| | | | | | Initial (psi) | After 2-Hr. Boil (psi) | % Retained | |
| 1 | 15 | 25 | | | 16,000 | | | 112 |
| 2 | 18.7 | 15 | | 1.42 | 3,200 | | | 118 |
| 3 | 18.7 | 15 | | 1.09 | 3,710 | | | 138 |
| 4 | 18.7 | 23 | | 1.45 | 4,690 | | | |
| 5 | 20 | 20 | 60/40 | 1.44 | 4,940 | 3,510 | 71 | |
| 6 | 20 | 20 | 68/32 | 1.30 | 4,620 | 3,190 | 69 | |

TABLE 1-continued

Physical Properties of Magnesium Oxycement/Kraft Paper Laminates

| Ex. No. | Wt. of Web lbs/ 3000ft² | No. of Web Layers | Wt. Ratio MOC to Web | Spec. Grav. Laminate | Modulus of Rupture Initial (psi) | After 2-Hr. Boil (psi) | % Retained | Impact Strength ins/lb. |
|---|---|---|---|---|---|---|---|---|
| 7  | 20 | 20  |       | 1.21 | 4,535  | 3,110 | 69 |     |
| 8  | 20 | 20* |       | 1.13 | 8,861  | 4,260 | 48 |     |
| 9  | 22 | 15  |       | 1.70 | 15,000 |       |    |     |
| 10 | 22 | 20  |       | 1.70 | 22,870 |       |    |     |
| 11 | 60 | 20  | 61/39 |      | 6,135  |       |    | 127 |
| 12 | 60 | 20  | 70/30 |      | 5,305  |       |    | 63  |
| 13 | 60 | 20  |       |      | 4,240  |       |    | 147 |
| 14 | 60 | 20  | 70/30 |      | 3,450  |       |    | 127 |
| 15 | 60 | 20  | 66/34 |      | 4,500  |       |    |     |
| 16 | 60 | 20  | 71/29 |      | 3,290  |       |    | 107 |
| 17 | 60 | 20  | 70/30 |      | 4,100  |       |    |     |

*Resin-impregnated paper adhered to both surfaces

Table 1 gives the physical properties of the laminates formed from kraft paper. The magnesium oxycement for Examples 1, 5, 6 and 8-15 was made using natural magnesium oxides and the remainder using a synthetic magnesium oxide. Two percent by slurry weight of a viscosity/flow control agent (a commercially available attapulgite) was added to the reactive slurries used in all of the Examples except 9 and 10; Examples 2 and 4 had 2% by weight wollastonite microfibers (equivalent spherical particle diameters of 1 to 3 μm and average aspect ratio of 15 to 1) and Example 17 had 10% by weight of these microfibers added; and Example 3 had 2% by weight of titanium dioxide added to the reactive slurry. The resin-impregnated paper was a urea-formaldehyde treated paper.

Generally, it will be seen from Table 1, that the modulus of rupture may be increased by using heavier paper, or by using a greater number of layers, and by adhering a sheet material such as a resin-impregnated paper to one or both surfaces of the laminate. Any combination of these techniques can, of course, be used to attain a predetermined desired strength while at the same time permitting flexibility in such other properties as modulus of elasticity and impact strength. This is of importance for it makes it possible to choose the optimum combination of properties for any form of final processing (molding, incorporation with a core material, application of a finishing surface and the like) used.

The boiling of the laminates in water for two hours is an extremely severe test to determine the stability of the laminates in the presence of water or moisture. It will be seen from the data of Table 1 that the samples exposed to this test generally exhibited remarkably high retention of modulus of rupture (structural strength) under these conditions.

TABLE 2

Physical Properties Of Magnesium Oxycement/Liner Paper Laminates

| Ex. No. | Wt. of Web lbs/ 3000 ft² | No. of Web Layers | Wt. Ratio MOC to Web | Spec. Grav. Laminate | Modulus of Elasticity (psi) | Modulus of Rupture Initial (psi) | After 2-Hr. Boil (psi) | % Retained |
|---|---|---|---|---|---|---|---|---|
| 18 | 26  | 11 |       |      | 444,600   | 3,314 |       |     |
| 19 | 26  | 15 |       |      | 617,200   | 5,185 |       |     |
| 20 | 33* | 10 |       |      | 224,600   | 3,786 |       |     |
| 21 | 33  | 14 |       |      | 999,200   | 6,840 |       |     |
| 22 | 40  | 10 |       |      |           | 3,050 |       |     |
| 23 | 42  | 10 | 51/49 | 1.17 |           | 4,440 | 5,360 | 121 |
| 24 | 42  | 10 | 55/45 | 1.26 |           | 4,000 | 3,630 | 91  |
| 25 | 42  | 12 |       |      | 755,800   | 5,835 |       |     |
| 26 | 42* | 12 |       |      | 291,500   | 4,112 |       |     |
| 27 | 42  | 12 | 65/35 | 1.14 |           | 6,335 | 3,440 | 54  |
| 28 | 42  | 12 |       | 1.27 |           | 4,140 | 3,360 | 81  |
| 29 | 60  | 15 |       | 1.30 |           | 3,680 |       |     |
| 30 | 64  | 5  |       |      | 292,900   | 4,800 |       |     |
| 31 | 64  | 6  |       |      | 664,000   | 3,820 |       |     |
| 32 | 64* | 6  |       |      | 1,254,000 | 8,600 |       |     |
| 33 | 64  | 7  |       |      | 229,000   | 5,200 |       |     |
| 34 | 90**| 3  |       |      | 222,305   | 4,156 |       |     |
| 35 | 90**| 4  |       |      | 179,590   | 3,406 |       |     |
| 36 | 90  | 5  |       |      | 158,756   | 2,278 |       |     |

*Resin-impregnated paper adhered to both surfaces
**Resin-impregnated paper adhered to one surface Table 2 gives the physical properties for a number of laminates using liner paper as the fibrous web material. In these examples, those numbered 22-24, 27, 28, 31 and 32 were made using natural magnesium oxide; all but Examples 34-36 had 2% by slurry weight of an attapulgite viscosity/flow control agent; and Example 28 was made with a reactive slurry containing 10% wollastonite microfibers. Examples 27 and 34-36 are each averages of two samples. In general, the physical property data for Examples 18-36 bear out the same conclusions set forth above for Examples 1-17. Table 2 also illustrates the well-known relationship between modulus of rupture and modulus of elasticity associated with laminates in general. Finally, the 2-hour water boil test indicates good stability for these laminates.

In Examples 37–42 of Table 3, the web material was sized liner or kraft paper. The reactive magnesium oxycement slurries used in all of these examples were made with natural magnesium oxide and they all included 2% by weight of a commercial attapulgite. Examples 38 and 41 are each averages of two samples.

Finally Table 4 presents physical data for laminates made from so-called "glass paper" as the fibrous web material. This glass paper was made by a papermaking technique using a small percent by weight kraft paper fibers as a binder, the remainder being glass fibers. It will be seen from the data of Table 4 that the modulus of rupture values compared very favorably with the laminates made from the different papers and that the percent retained after the two-hour boil test was generally exceptionally high, indicating that the magnesium oxycement, present in very high weight ratios, was very stable structurally.

A laminate using a commercially available fire-resistant paper (weight of 38.5 pounds/3000 square feet in 10 layers) and another using a kraft insulating paper (weight of 30 pounds/3000 square feet in 20 layers) gave modulus of rupture values of 3,680 and 8,200 psi, respectively.

TABLE 3

Physical Properties Of Magneium Oxycement/Sized Liner or Kraft Laminates

| Ex. No. | Wt. of Web lbs/3000ft³ | No. of Web Layers | Spec. Grav. Laminate | Modulus of Rupture (psi) | Impact Strength in./lbs |
|---|---|---|---|---|---|
| 37 | 15 | 25 | 1.54 | 6,560 | 80 |
| 38 | 20 | 25 | 1.47 | 5,785 | 128 |
| 39 | 20* | 25 | 1.57 | 5,660 | 132 |
| 40 | 20 + 190 | 6 + 1 | 0.97 | 7,200 | |
| 41 | 42 | 10 | 1.09 | 5,835 | 92 |
| 42 | 42** | 10 | 1.04 | 10,800 | |

*Glass viel adhered to both faces
**Resin-impregnated paper adhered to both faces

TABLE 4

Physical Properties of Magnesium Oxycement/Glass Paper Laminates

| Ex. No. | Paper Thickness (mils) | No. of Web Layers | Wt. Ratio MOC to Web | Spec. Grav. Laminate | Modulus of Rupture | | |
|---|---|---|---|---|---|---|---|
| | | | | | Initial (psi) | After 2-Hr.Boil (psi) | % Retained |
| 43 | 5 | 15 | 92/8 | 1.67 | 2,110 | 1,620 | 77 |
| 44 | 7 | 12 | 91/9 | 1.87 | 7,010 | 3,640 | 52 |
| 45 | 7 | 12 | | 1.64 | 6,030 | 5,820 | 97 |
| 46 | 7 | 14 | | 1.57 | 5,850 | 5,260 | 90 |
| 47 | 10 | 9 | 85/15 | 1.84 | 10,420 | 9,470 | 91 |

Laminates chosen from each of those given in Tables 1–4 were evaluated for flammability using the two-foot tunnel test described in the *Journal of Paint Technology*, 46; No. 591, pp 62–69 (April 1971). In this test the specimen is mounted on an angle-iron frame so that the surface to be evaluated forms the inclined (28° from horizontal) ceiling of a chamber which is 4 inches wide and 2 feet long. The sides and lower end, where the burner is located, are closed. The higher end is open and is used to observe the test. The test specimen is subjected to a flame for five minutes from a Fisher burner receiving gas at a flow rate between 4.2 and 4.8 cubic feet per hour. During the first four minutes the length of the advance of the flame front up the inclined specimen surface is recorded at 15-second intervals. The flame spread rating is determined by first calibrating the tunnel by testing asbestocement board and dry red oak. These materials are rated 0 and 100 flame spread, respectively; and the materials to be evaluated are then rated on flame spreads relative to the 0 to 100 scale thus established. A flame spread rating of 25 or less makes it possible to give the material a Class A rating. The laminates of this invention had flame spread ratings of between 15 and 20 and thus they have been referred to herein as nonflammable.

The combination of physical properties and nonflammability of the laminates of this invention and of composites formed incorporating them makes them very attractive for many uses. These laminates can be molded into predetermined configurations and the resulting structures used for many different applications. Since both the fibrous web material, e.g., kraft paper, and the magnesium oxycement are inexpensive relative to other types of web materials and synthetic organic resins, these laminates can be made at relatively low cost.

It will thus be seen that the objects set forth above, among those made apparent from the preceding description, are efficiently attained and, since certain changes may be made in carrying out the above method and in the article set forth without departing from the scope of the invention, it is intended that all matter contained in the above description or shown in the accompanying drawings shall be interpreted as illustrative and not in a limiting sense.

We claim:

1. A composite material comprising a laminate formed of bonded, distinct alternating layers of a cured magnesium oxycement and a fibrous web said cured magnesium oxycement in said laminate being formed by laying down a liquid reactive water slurry and curing said slurry, the composition of said slurry being such as to retain essentially all of the water of said slurry in said cured magnesium oxycement.

2. A composite material in accordance with claim 1 wherein said slurry contains a viscosity/flow control agent.

3. A composite material in accordance with claim 1 wherein said magnesium oxycement layers are of essentially the same thickness throughout said laminate.

4. A composite material in accordance with claim 3 wherein at least one of said magnesium oxycement layers have filler material distributed therethrough.

5. A composite material in accordance with claim 1 wherein said magnesium oxycement layers are of varying thickness throughout said laminate.

6. A composite material in accordance with claim 5 wherein at least one of said magnesium oxycement layers have filler materials distributed therethrough.

7. A composite material in accordance with claim 5 wherein at least one of the magnesium oxycement layers nearest at least one of the surfaces of said laminate is thicker than the other of said magnesium oxycement layers.

8. A composite material in accordance with claim 7 wherein said at least one magnesium oxycement layer has a filler material distributed therethrough.

9. A composite material in accordance with claim 8 wherein said filler material comprises a continuous permeable web embedded within said at least one magnesium oxycement layer which retains its integrity as a separate layer.

10. A composite material in accordance with claim 8 wherein said filler material comprises reinforcing microfibers.

11. A composite material in accordance with claim 1 wherein said cured magnesium oxycement layers in said laminates are formed by laying down a liquid reactive water slurry comprising a magnesium salt solution and magnesium oxide.

12. A composite material in accordance with claim 11 wherein said magnesium salt is magnesium chloride.

13. A composite material in accordance with claim 11 wherein said magnesium salt is magnesium sulfate.

14. A composite material in accordance with claim 1 wherein said fibrous web comprises paper.

15. A composite material in accordance with claim 14 wherein said paper is kraft paper having a weight of from about 10 pounds to about 100 pounds per 3000 square feet.

16. A composite material in accordance with claim 15 wherein said kraft paper is sized.

17. A composite material in accordance with claim 1 wherein said fibrous web is formed of cellulosic fibers, glass fibers, synthetic resin fibers or mixtures thereof.

18. A composite material in accordance with claim 1 wherein the weight ratio of magnesium oxycement to fibrous web in said laminate ranges between about 10 to 90 and about 90 to 10.

19. A composite material in accordance with claim 1 comprising a core member having said laminate adhered to one or both of its surfaces.

20. A composite material in accordance with claim 19 wherein said core member is a cellular material.

21. A composite material in accordance with claim 20 wherein said cellular material is formed of a synthetic resin.

22. A composite material in accordance with claim 20 wherein said cellular material is formed of a magnesium oxycement.

23. A composite material in accordance with claim 1 having at least one surface finish.

24. A composite material in accordance with claim 23 wherein said surface finish comprises a synthetic resin impregnated paper adhered to said laminate.

25. A composite material in accordance with claim 1 shaped into a predetermined configuration.

* * * * *